United States Patent Office 3,063,839
Patented Nov. 13, 1962

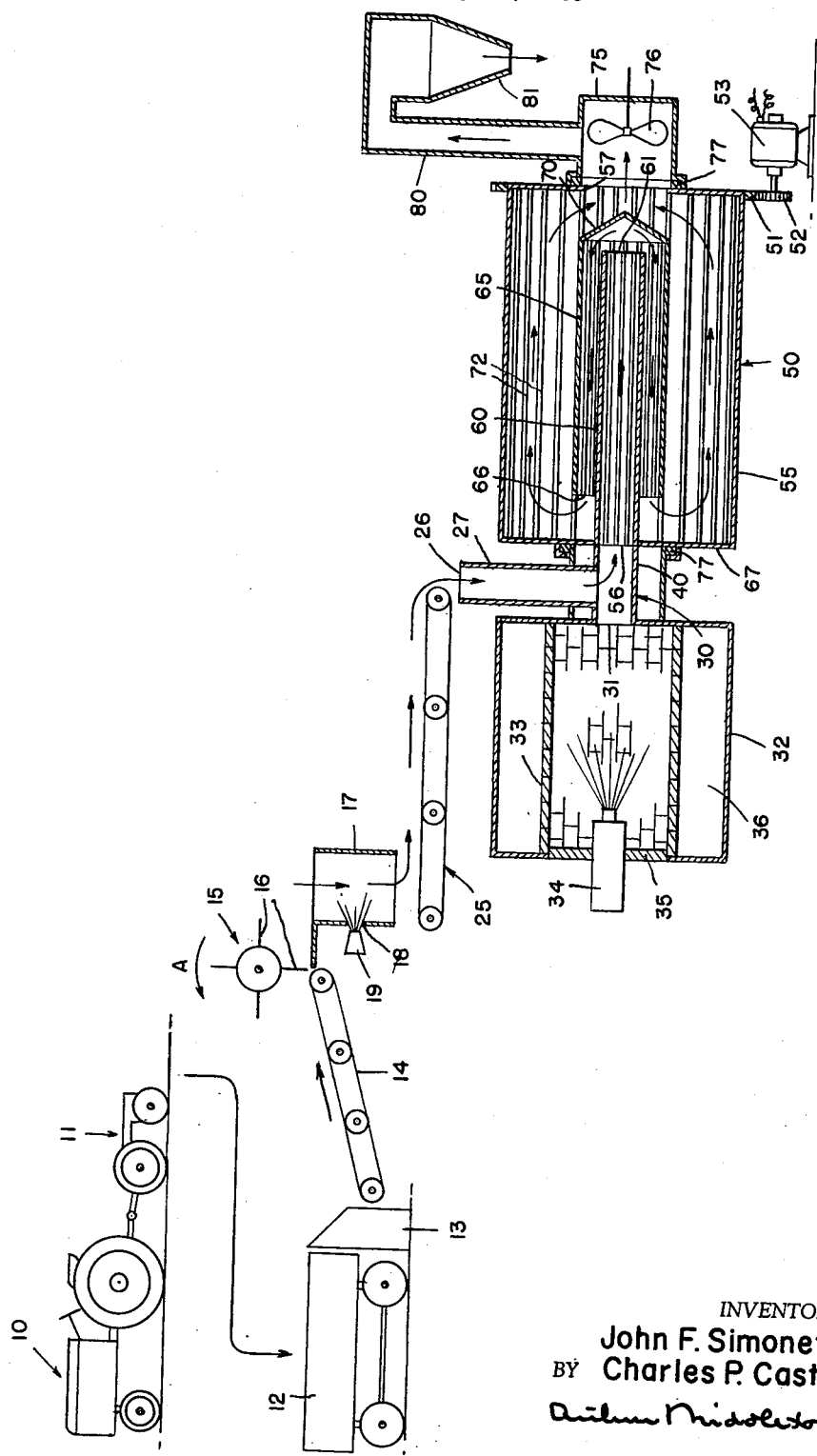

3,063,839
PROTEINIZING GREEN FORAGE PLANT MATERIAL
John F. Simonet and Charles P. Castle, both of P.O. Box 1140, Madera, Calif.
Filed July 17, 1959, Ser. No. 827,917
9 Claims. (Cl. 99—2)

The present invention relates to the enhancement of the naturally occurring crude protein in greenleaved forage plants of the type used as food for ruminants and other animals. Such plants comprise grasses, legumes, alfalfa, clover, and the like. A particular significant feature of the invention is the fact that the amino acid content of such plants is enhanced by the practice of the present invention. In addition, a new whole alfalfa product is produced having a proteinaceous content superior to that previously known.

As used throughout the specification and claims, the term "proteinaceous content" is intended to denote the portion of the material comprising amino acids and their complex products such as peptides and protein. Enhancement of naturally occurring crude proteinaceous content of such green forage plant materials in a simple and economical manner has presented a longstanding problem in the art which the present invention successfully solves.

It has been known for some time that certain additives such as sugar, phosphorous compounds, vitamins, and other materials sufficiently enhance the nutrient value of feeds to warrant utilization for certain purposes. The addition of such additives does not, however, actually enhance the proteinaceous value of the material itself, and accordingly, can not produce the improved results of the present invention. Efforts have also been made to increase the nitrogen content of green forage plant material by ammoniation, which type of processing while being effective to a certain extent has major disadvantages that have prevented this type of processing from being widely accepted.

Some of the major differences between the present invention and an ammoniating type process are described herein to point out the particular advantages of the present invention as contrasted to prior art practices. An ammoniating process imparts to the treated material a substantial amount of water soluble non-protein nitrogen. In addition, processes are carried out under pressure thereby requiring bulky and expensive pressurized vessels for carrying out the process.

The present invention overcomes the disadvantages obtained with these prior art processes by providing an end product of greatly enhanced amino acid composition, not merely unchanged water-soluble non-protein nitrogen. No special pressure equipment is required for carrying out the present invention, but on the contrary, the process is normally conducted at atmospheric pressures.

It has been known in the prior art to first treat the foliage of plants with a mist of urea, and then to harvest the foliage at from 8 hours to 10 days thereafter for increasing the nutritive value to animals. This type of process employs the normal plant functions of the growing plant to obtain the desired results. In sharp contrast to this concept, the present invention is based upon the discovery that a totally unexpected result is obtained when harvested plant material is treated with a nitrogenous material, preferably urea, and then subjected to an environment of heat by producing an enhancement of the naturally occurring proteinaceous content of the plant material after the plan material has been completely severed and cut from its roots.

Again, in contrast to prior art practices, this totally unexpected result may be obtained almost immediately under the conditions of this invention. Still further, in contrast to prior art practices, the time of processing may follow immediately after the plant material has been separated from its root system or any time thereafter, this longer time being limited only by spoilage of the green plant material which is discernible by any person practiced in the art.

Alfalfa, for example, after being harvested or cut from its root system, has an ability to react with urea under heat to yield an increased proteinaceous content.

The problem then arises as to how to provide the plant with paper access to the urea which is preferably provided in a liquid solution. Firstly, the separated alfalfa can be comminuted, and secondly, the alfalfa is saturated or wetted with a urea solution.

The treated material is then subjected to a heat environment such that the reaction is completed.

An especially important feature of the present invention lies in the effect of the process on the carotene content or vitamin A activity of the treated material. It is well recognized that in conventional dehydrating processes, the carotene content is substantially reduced. In contrast to such prior art dehydrating processes, the present invention produces a significant reduction in the loss which conventionally occurs in the carotene content during dehydration. This is very significant since a reduction in the carotene content losses is highly advantageous and represents a major improvement in the art.

An additional important feature of the present invention is the retention in the end product of a brighter green color of the plant material. Such a green color increases the value of the material as an animal feed and is highly desirable.

An object of the present invention is to provide a new and novel process for enhancing augmentingly the proteinaceous content of green forage plants, and particularly to increase the amino acid content thereof.

Another object of the invention is ot dehydrate such plant material and to significantly reduce the carotene losses which occur during such dehydration.

A further object of the invention is to provide a process for maintaining such enhanced plant material in a condition that is stabilized in its keeping or storage qualities including maintaining its green color, while avoiding degradation of palatableness of the end product to animals to which it is to be fed.

Still another object of the invention is to devise a process by which the extent or degree of enhancement of the proteinaceous content of the plant material may be controlled.

Yet another object of the invention is the provision of a novel method for accomplishing the above objects which is simple and inexpensive, and yet which produces outstanding results and can be carried out with a minimum of supervision.

A still further object of the invention is to provide an improved product comprising alfalfa having an increased proteinaceous content.

Other objects and many attendant advantages of the invention will become more apparent when considered in connection with the specification and accompanying drawing which illustrates in a schematic manner the process according to the present invention.

Referring now to the drawing, a conventional tractor is indicated by reference numeral 10, the tractor being connected to a cutting unit 11 which is of conventional construction for severing the tops of alfalfa plants or the like from the roots.

Cutting unit 11 may also incorporate conventional means for comminuting the plant material to reduce it to relatively small size. While it is not absolutely necessary to comminute the material, it is considered to be preferable in obtaining the desired results.

After having cut the green forage plant material from its roots, the material is transferred into a wagon or similar conveyance 12 which may be towed to some central location where the cut material is processed. There will ordinarily occur a certain time delay between the time the material is cut and preferably comminuted and the time at which subsequent treatment thereof takes place. Generally speaking, further processing should take place as soon as possible, but the permissible elapsed time between cutting and further processing varies in accordance with the particular atmospheric conditions existing, and generally will not exceed eight hours. The main conditions are that when further processing takes place, the green forage plant material should not have any substantial discoloration or browning and should still have a fresh odor which is readily discernible by one skilled in the art.

After the cut material is loaded in wagon 12, it is transported to an unloading ramp 13 where the material is guided onto an endless conveyor 14, the conveyor carrying the cut material to a point where a proportioner means indicated generally by reference numeral 15 is located. Proportioner means 15 is of conventional construction and comprises an elongated cylinder having a plurality of spokes 16 spaced 90 degrees apart about the outer circumference thereof. Proportioner means 15 rotates in the direction of arrow A and serves to control the rate of feed of the cut material into the remaining portion of the apparatus.

The cut material then passes down through an open-ended conduit 17. An opening 18 is provided in one wall of the conduit, and a nozzle 19 is disposed adjacent opening 18 in such a position as to produce a fine spray of liquid within conduit 17. Urea in solution is supplied to nozzle 19 and is operated within conduit 17 in such a manner as to preferably substantially saturate the cut material as it passes downwardly through conduit 17. The urea is preferably in a water solution, the composition of the solution being described hereinafter. In addition, it should be noted that although a nozzle means is shown for spraying the solution upon the plant material, other means may be provided for wetting the surfaces of the material as for instance by immersing the separated material in a urea solution bath or the like.

The treated cut material drops from conduit 17 on an endless conveyor 25 which carries the material to the upper open end 26 of a chute 27. The material passes downwardly through chute 27 into what may be termed the throat portion which is indicated generally by reference numeral 30 of the heating means. One end portion 31 of the throat portion opens into the interior of an oven 32 including a brick-lined central cylindrical portion 33 having a conventional oil burner mechanism 34 extending into one end thereof, burner mechanism 34 being mounted in a door 35 hingedly supported on the oven. An annular air space 36 is provided around oven portion 33 to provide insulation therefor.

The opposite end 40 of throat portion 30 is in communication with the central portion of a rotatable dehydrating tube indicated generally by reference numeral 50. Tube 50 is adapted to be rotated in any conventional manner and is illustrated schematically as being provided with an external gear 51 which engages a gear 52 fixed on an electric motor or the like 53. It is apparent that any conventional means may be employed for rotating the dehydrating tube. Tube 50 comprises a first cylindrical member 55 having an opening 56 at one end thereof and an opening 57 at the opposite end thereof. A central tubular portion 60 is formed concentric with member 55, tubular portion 60 extending from a point adjacent opening 56 of the dehydrating tube to a point 61 spaced from opening 57 of the dehydrating tube.

An intermediate tubular portion 65 has an open end 66 spaced from the end wall 67 of the dehydrating tube, the opposite end portion of tubular portion 65 being closed as indicated at 70 and being spaced from the end portion 61 of the central tubular portion 60. A plurality of longitudinally extending ribs 72 extend radially inwardly of each of portions 55, 60 and 65 and produces a tumbling action on the material passing therethrough during operation of the dehydrating tube. It is evident that the material will pass through the apparatus as indicated by the arrows, the material first passing through tubular portion 60 and then through tubular portion 65 and finally through the outer end portion 55 and through the open end 57 of the dehydrating tube.

A hollow housing 75 is provided in surrounding relationship to the open end 57 of the dehydrating tube, a centrifugal blower fan 76 being rotatably mounted in housing 75 and constantly rotated during operation by a suitable means such as an electric motor (not shown). The dehydrating tube is sealed at opposite ends thereof by suitable rotary sealing means 77 which may be of conventional construction.

An outlet tube 80 is in communication with the interior of housing 75 and has the outer end thereof connected to a hopper 81 adapted to collect the treated material.

The heating mechanism according to the present invention is adapted to operate at atmospheric pressure, the heating means being controlled by suitable well-known thermostatic controls to provide a temperature of the green forage plant material within the dehydrating tube that lies within the range of 160 degrees F. to an upper limit of 220 degrees F. The upper limit combined with the time of heat treatment being chosen to prevent degradation of the end product. The separated material is treated within the aforementioned temperature range for a period of at least one half minute.

The moisture content of the green forage plant material is reduced during the heating process to less than approximately 20 percent moisture, and preferably in the range of 5 to 13 percent, whereby it is apparent that a major portion of the moisture content of the plant material is effectively removed during the treatment thereof.

It is noted that the above-described temperature and time limitations are critical in producing the desired results according to the present invention as well as the particular moisture content of the finished product.

It is apparent that the blower fan 76 will serve to suck the material through the dehydrating tube and thence cause the treated material to settle in the storage hopper 81. The material as stored in hopper 81 can then be utilized as desired as feed, as a source of material for proteins, or for other purposes demanding high protein availability. The material is often reground to smaller particle size prior to use.

In order to illustrate the manner in which the process according to the present invention is carried out, the following examples are given for treating alkalfa:

EXAMPLE I

Alfalfa was separated from its root system in the field and transported to the point of processing. At the time of arrival of the separated material at the process equipment, the alfalfa had been separated from the plant less than 8 hours, was not discolored and had a fresh odor.

At the process point, the surfaces of the alfalfa were substantially wetted by spraying the surface with a solution of urea and water just prior to entering the heat treatment zone.

The wetted alfalfa was then conveyed through the heat treatment zone wherein the temperature of the product was raised to approximately 220 degrees F. and maintained at this level for ½ minute so that the end product had an average moisture content of about 8.4 percent. A control sample was provided for comparison. 28,220 pounds of alfalfa having an initial average moisture content of 80 percent was treated with 858.3 pounds of a urea and water solution containing 78 pounds of moisture-free urea.

The following table illustrates the amount of various amino acids as well as gross crude protein existing in the product produced in Example I as well as a control sample, and further illustrates the percentage increase of the various substances.

*Table I*

| Substance | Grams per 100 Gms. (Moisture-Free Basis)—Control Material | Grams per 100 Gms. (Moisture-Free Basis)—Example I | Percent Increase Moisture-Free Basis—Ex. I over Control |
| --- | --- | --- | --- |
| Gross Crude Protein (N × 6.25) | 14.79 | 17.24 | 16.8 |
| Methionine | .39 | .50 | 28.0 |
| Leucine | .7 | 1.3 | 86.0 |
| Lysine | .7 | 1.3 | 86.0 |
| Isoleucine | 1.3 | 1.5 | 15.0 |
| Phenylalanine | 1.3 | 1.3 | ±0 |

EXAMPLE II

Alfalfa was separated from its root system in the field and transported to the point of processing. At the time of arrival of the separated material at the process equipment, the alfalfa had been separated from the plant less than 8 hours, was not discolored and had a fresh odor.

At the process point, the surfaces of the alfalfa were substantially wetted by spraying the surfaces with a solution of urea and water just prior to entering the heat treatment zone.

The wetted alfalfa was then conveyed through the heat treatment zone wherein the temperature of the product was raised to approximately 180 degrees F. and maintained at this level for ½ minute so that the end product had an average moisture content of about 9.5 percent. A control sample was provided for comparison. 26,590 pounds of alfalfa having an initial average moisture content of 80 percent was treated with 900.5 pounds of urea and water solution containing 160 pounds of moisture-free urea.

The following table illustrates the amount of various amino acids as well as gross crude protein existing in the product produced in Example II as well as a control sample, and further illustrates the percentage increase of the various substances.

*Table II*

| Substance | Grams per 100 Gms. (Moisture-Free Basis)—Control Material | Grams per 100 Gms. (Moisture-Free Basis)—Example II | Percent Increase Moisture-Free Basis—Ex. II over Control |
| --- | --- | --- | --- |
| Crude Protein (N × 6.25) | 14.79 | 20.89 | 41.5 |
| Methionine | .39 | .51 | 31 |
| Leucine | .7 | 1.3 | 86 |
| Lysine | .7 | 1.1 | 57 |
| Isoleucine | 1.3 | 1.3 | ±0 |
| Phenylalanine | 1.3 | 1.4 | 8 |

EXAMPLE III

Alfalfa was separated from its root system in the field and transported to the point of processing. At the time of arrival of the separated material at the process equipment, the alfalfa had been separated from the plant less than 8 hours, was not discolored and had a fresh odor.

At the process point, the surfaces of the alfalfa were substantially wetted by spraying the surfaces with a solution of urea and water just prior to entering the heat treatment zone.

The wetted alfalfa was then conveyed through the heat treatment zone wherein the temperature of the product was raised to approximately 192 degrees F. and maintained at this level for ½ minute so that the end product had an average moisture content of about 8.7 percent. A control sample was provided for comparison. 26,020 pounds of alfalfa having an initial average moisture content of 80 percent was treated with 923 pounds of urea and water solution containing 246 pounds of moisture-free urea.

The following table illustrates the amount of various amino acids as well as gross crude protein existing in the product produced in Example III as well as a control sample, and further illustrates the percentage increase of the various substances.

*Table III*

| Substance | Grams per 100 Gms. (Moisture-Free Basis)—Control Material | Grams per 100 Gms. (Moisture-Free Basis)—Example III | Percent Increase Moisture-Free Basis—Ex. III over Control |
| --- | --- | --- | --- |
| Crude Protein (N × 6.25) | 14.79 | 24.31 | 64.5 |
| Methionine | .39 | .65 | 67 |
| Leucine | .7 | 1.8 | 157 |
| Lysine | .7 | 1.2 | 72 |
| Isoleucine | 1.3 | 1.3 | ±0 |
| Phenylalanine | 1.3 | 1.1 | −15 |

EXAMPLE IV

Alfalfa was separated from its root system in the field and transported to the point of processing. At the time of arrival of the separated material at the process equipment, the alfalfa had been separated from the plant less than 8 hours, was not discolored and had a fresh odor.

At the process point, the surfaces of the alfalfa were substantially wetted by spraying the surfaces with a solution of urea and water just prior to entering the heat treatment zone.

The wetted alfalfa was then conveyed through the heat treatment zone wherein the temperature of the product was raised to approximately 160 degrees F. and maintained at this level for ½ minute so that the end product had an average moisture content of about 1.5 percent. A control sample was provided for comparison. 29,125 pounds of alfalfa having an initial average moisture content of 80 percent was treated with 891.4 pounds of a urea and water solution containing 317 pounds of moisture-free urea.

The following table illustrates the amount of various amino acids as well as gross crude protein existing in the product produced in Example IV as well as a control, and further illustrates the percentage increase of the various substances.

*Table IV*

| Substance | Grams per 100 Gms. (Moisture-Free Basis)—Control Material | Grams per 100 Gms. (Moisture-Free Basis)—Example IV | Percent Increase Moisture-Free Basis—Ex. IV over Control |
| --- | --- | --- | --- |
| Crude Protein (N × 6.25) | 14.79 | 26.21 | 77.5 |
| Methionine | .39 | .64 | 64 |
| Leucine | .7 | 1.7 | 143 |
| Lysine | .7 | 1.6 | 129 |
| Isoleucine | 1.3 | 1.3 | ±0 |
| Phenylalanine | 1.3 | 1.6 | 23 |

In the experiments hereinabove described the method used for the determination of total gross crude protein (nitrogen × 6.25) is that described in the Official Methods of Analysis of the Association of Official Agricultural Chemists, 7th Edition, 1955.

The methods used for the determination of the amino acids are those found in the Manual of Paper Chromatography and Paper Electrophoresis, 2nd Edition, 1958, Block Durrum and Zweig and the Amino Acid Composition of Proteins and Foods, 2nd Edition, 1951, Block and Bolling.

The following table illustrates the amount of urea employed in each example to the amount of alfalfa treated in the particular example by weight on a moisture-free basis.

Table V

| Example | Urea # (Moisture-Free Basis) | Alfalfa # (Moisture-Free Basis) | Percent Urea to Alfalfa |
|---|---|---|---|
| 1 | 78 | 5,644 | 1.38 |
| 2 | 160 | 5,318 | 3.01 |
| 3 | 246 | 5,204 | 4.73 |
| 4 | 317 | 5,825 | 5.44 |

It is apparent from the foregoing table that an increasing percentage of urea was utilized in Examples 1 to 4. A perusal of the tables given in each of Examples 1–4 indicates that the percentage increase of gross crude protein in each example was substantially increased. In other words, it is apparent that the larger percentage of urea to alfalfa employed, the greater the enhancement of the gross crude protein. This provides a very effective manner for controlling the amount or degree of proteinaceous content enhancment in the process. It is also apparent that the percentage increase in the individual amino acid may also be controlled by varying the percentage of urea to alfalfa employed.

It should be noted, however, that the percentage of urea to alfalfa can not be increased indiscriminately since it has been found that above a certain level, the amount of residual uncombined urea becomes excessive. It has been found that an upper limit of 10 percent of urea to alfalfa by weight on a moisture-free basis is critical and an increase of the percentage of urea to alfalfa beyond this point produces unsatisfactory results.

The amounts of gross crude protein and certain amino acids produced by the invention process have been given in the various examples. In order to appreciate the remarkable results of this process, the following figures illustrate the highest values of the various amino acids which have been previously found to exist in alfalfa:

Grams/100 grams
(1) Methionine _____ .32
(2) Leucine _____ 1.4
(3) Lysine _____ 1.0
(4) Phenylalanine _____ 1.0

The authority for the values for the first three substances listed above is as follows:

Proteins and Amino Acids in Animal Nutrition, 4th Edition, H. J. Almquist, page 12, printed through courtesy U.S. Industrial Chemicals Co., 1957.

The authority for the value listed for the fourth substance above is as follows:

Composition of Cereal Grains and Forages, page 486, published June 1958 by Committee on Feed Composition, Agricultural Board, National Academy of Sciences National Research Council.

The highest known gross crude protein content of alfalfa is 20 percent by weight, the authority for this figure being as follows:

Feeds and Feeding, 22nd Edition, Frank B. Morrison, Morrison Publishing Co., published 1956, page 1073, 20 percent dehydrated alfalfa; average composition, page 1,000.

When the above figures as known in the prior art are compared with the increasing values obtained according to the present invention, it is apparent that applicant has provided a truly new alfalfa product which has not heretofore existed, the end product according to the present invention having a remarkably increased proteinaceous content as measured in terms of gross crude protein and various amino acids.

In addition, the alfalfa product of the present invention has a carotene content superior to that of comparable dehydrated alfalfa products and is provided with a noticeably greener color than that of the prior art. Furthermore, the scorched odor which is present in commercially dehydrated alfalfa is completely avoided in the present invention and the odor of the end product is sweet and fresh.

The method according to the present invention is particularly adapted for producing feed for ruminant and non-ruminant animals including fowls, and can even be employed for producing enhanced proteinaceous contents utilizable for feed by man. The method is quite simple and in carrying out the method, the operation of the proportioner and the urea applicating nozzle are first adjusted, the temperature of the dehydrating tube as well as the passage time therethrough being adjusted between the burner mechanism and the lower fan. After these initial adjustments are made, the method is carried out substantially automatically, thereby requiring a minimum of skill on the part of the operator and very little supervision.

It is apparent from the foregoing that there is provided a new and novel process for enhancing augmentingly the naturally occurring proteinaceous content of green-leaved forage plants, and particularly to increase the amount of amino acids therein. The present invention process provides a dehydrating action wherein the losses in the carotene content of the plant are significantly reduced. The process provides a finished product which is stabilized in its keeping or storage qualities including maintaining its green color while avoiding degradation of palatableness of the end product to animals to which it is to be fed. In addition, the extent or degree of enhancement of the proteinaceous content may be controlled in a very simple and effective manner. The process is simple and inexpensive, and yet produces outstanding results with a minimum of supervision.

A new alfalfa product is provided, the alfalfa product containing a remarkably enhanced proteinaceous content. The product additionally has an improved odor and a superior green color to prior art products, the carotene content or vitamin A activity being at a higher level than that of products produced in prior art processes.

As this invention may be embodied in several forms without departing from the spirit or essential characteristics thereof, the present embodiment is therefore illustrative and not restrictive, and since the scope of the invention is defined by the appended claims, all changes that wall within the metes and bounds of the claims or that form their functional as well as conjointly cooperative equivalents are therefore intended to be embraced by those claims.

We claim:

1. The process of increasing the amino acid content of green-leaved forage plant material comprising separating the plant material from its roots, supplying a solution of urea to the separated plant material while the separated plant material does not have any substantial discoloration and while the material still has a fresh odor, and then subjecting the urea-treated plant material to a dehydrating environment of heat for a time for yielding a dry stabilized product that is palatable to animals and which contains increased amounts of amino acids.

2. The process of enhancing augmentingly the naturally occurring gross crude proteinaceous content of plant material which comprises separating the plants from their root systems, supplying urea to the separated plant material to wet it while the separated plant material does not have any substantial discoloration and while the material still has a fresh odor, and subjecting the urea-treated plant material to a temperature of at least 160 degrees F., but less than the temperature which produces degradation of the material.

3. The method as defined in claim 2, wherein the plant material is subjected to said temperature for a period of at least one-half minute.

4. The process of increasing the naturally occurring amino acid content of green-leaved forage plant material which comprises separating the plant material from its root systems, then supplying urea to the separated plant material while the separated plant material does not have any substantial discoloration and while the material still has a fresh odor, the urea lying in a range of 1 to 10 percent by weight of the treated plant material on a moisture-free basis, and subjecting the treated plant material to a dehydrating environment of heat for yielding a dried stabilized product that is palatable to animals and has increased amounts of amino acide therein.

5. The process of enhancing augmentingly the naturally occurring gross crude proteinaceous content of green-leaved forage plants which comprises separating the plants from their root systems, supplying a solution of urea to the separated plant material while the separated plant material does not have any substantial discoloration and while the material still has a fresh odor, and then subjecting the material to an elevated temperature lying in the range of 160 degrees F. to 220 degrees F. to reduce the moisture content of the material to less than one-half the moisture content existing immediately prior to heating the material.

6. The process of enhancing augmentingly the amino acid content of forage plants which comprises separating plant material from the plants, then supplying a solution of urea to the separated plant material to wet the material while the separated plant material does not have any substantial discoloration and while the material still has a fresh odor, the amount of urea to plant material being in the range of 1 percent to 10 percent on a moisture-free basis, and then heating the urea-treated material for at least one-half minute at a temperature of at least 160 degrees F.

7. The process as defined in claim 6, wherein the urea-treated material is heated to a temperature no greater than 220 degrees F.

8. The process as defined in claim 6, wherein the heat is continued for a period of time to reduce the moisture content of the end product to a point so as not to exceed 20 percent on a moisture-free basis.

9. The process of enhancing augmentingly the naturally occurring gross crude proteinaceous content of green-leaved forage plants which comprises separating the plants from their root systems, comminuting the plant material, supplying a solution of urea to the comminuted material to wet it while the comminuted plant material does not have any substantial discoloration and while the material still has a fresh odor, and subjecting the urea-treated plant material to a dehydrating environment of heat in the range of 160 degrees F. to 220 degrees F. for a period of at least one-half minute to reduce the moisture content of the material to less than one-half the moisture existing immediately prior to heating the material for yielding a dry stabilized product that is palatable to animals and has its naturally occurring proteinaceous content substantially augmented.

References Cited in th file of this patent
UNITED STATES PATENTS

| | | |
|---|---|---|
| 2,293,845 | Millar | Aug. 25, 1942 |
| 2,768,895 | Kamlet | Oct. 30, 1956 |
| 2,802,307 | Belasco | Aug. 13, 1957 |

OTHER REFERENCES

Mills et al.: Jour. of Dairy Science 27 (1944), pp. 571–8.